July 16, 1940.  E. S. SMITH, JR  2,207,949
TELEMETRIC CONTROLLER
Filed Feb. 20, 1937   2 Sheets-Sheet 1

INVENTOR
ED S. SMITH, JR.
BY
Maxwell Barnes
ATTORNEY

Patented July 16, 1940

2,207,949

UNITED STATES PATENT OFFICE 2,207,949

TELEMETRIC CONTROLLER

Ed S. Smith, Jr., St. Albans, N. Y., assignor to Builders Iron Foundry, Providence, R. I., a corporation of Rhode Island Application February 20, 1937, Serial No. 126,913

13 Claims. (Cl. 172—239)

This invention relates to methods of and apparatus for telemetrically controlling a dependent quantity by a master quantity.

An object of the invention is to provide a novel and distinctive control system wherein the variable quantity may be controlled telemetrically and with high accuracy from the master quantity. Another object is the provision of a novel and precise control system for telemetrically governing the dependent quantity under the control of signals coresponding as a function of time with the master quantity.

A further feature of the invention resides in a control system comprising pacer means adapted to respond immediately to variations from the desired relationship between the dependent quantity and the master quantity, and responsive also to very slight variations from said relationship, in combination with means governed by said pacer means for effectively regulating the dependent quantity to restore said relationship. The invention includes pacer means capable of instant starting and stopping in response to signals representative of even extremely slight variations in the relation between the master and dependent quantities, in conjunction with more powerful dependent-quantity regulating-means movable only when necessary, under control of the pacer means, for effecting the appropriate regulation.

A further object is the provision of a control system wherein the pacer means, while capable of sensitive and prompt response to very small variations in the aforesaid relationship, will not cause fluctuation or hunting of the regulating means. The pacer means at the same time is capable of acting as an accurate integrator, bringing the regulating means into action promptly upon the accumulation of a predetermined variation from the desired relation between the dependent and master quantities.

A further specific feature of the invention resides in the provision of an integrator-type receiver responsive to time function signals commensurate with the master quantity, in conjunction with follow-up means responsive to the control of the dependent quantity. The invention further provides pacer motor means responsive to the time-function telemetric signals in combination with other motor means controlled jointly by said pacer motor and by a follow-up means for obtaining a particularly accurate and sensitive control.

Other features and advantages of the invention will be hereinafter described and claimed.

Figure 1:
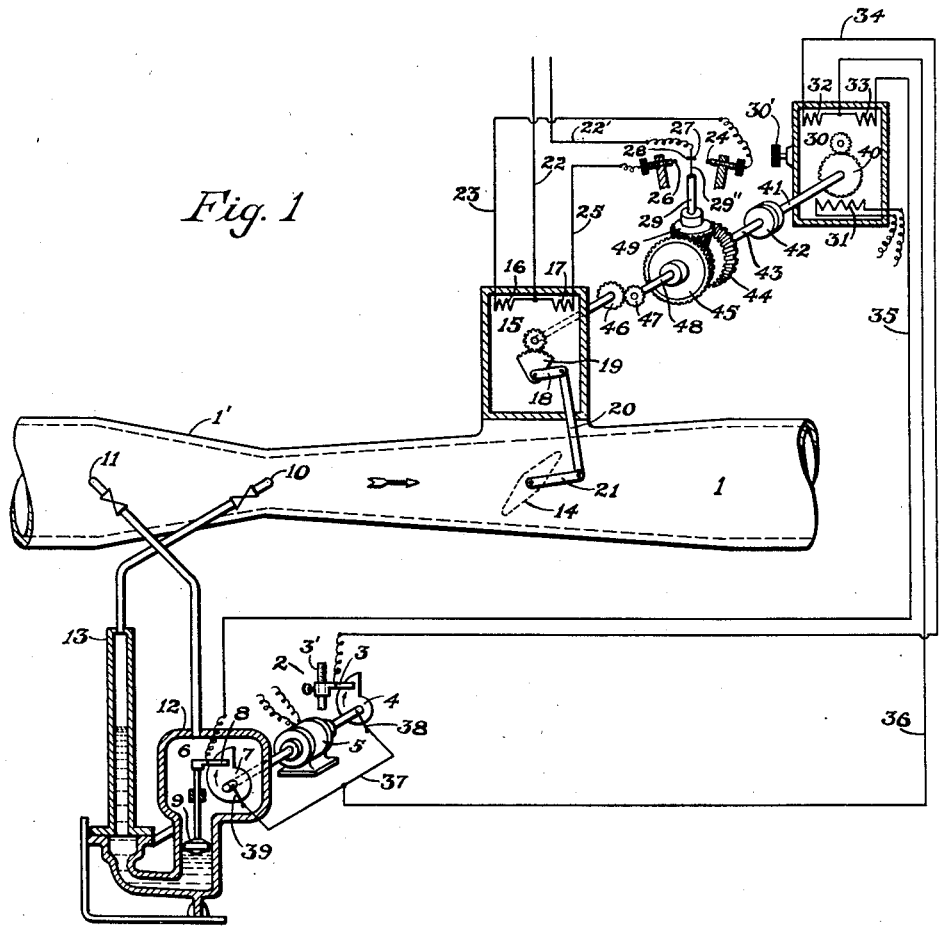
Fig. 1 is a diagrammatic view, with certain parts in side elevation and others in vertical section, illustrating an embodiment of my invention.

Referring to the drawings, in Fig. 1 the invention is shown applied to maintaining a given rate of flow of a liquid through a conduit 1 as determined by master transmitter 2. The latter comprises a manually settable contactor 3, a linear scale 3', and a lineal cam 4 driven continuously at a constant rate of speed by synchronous motor 5, energized from a suitable current source.

An actual rate transmitter 6 comprises a square root cam 7 cooperating with a contactor 8 positioned by a float 9 in accordance with the differential pressure between taps 10 and 11 connected to conduit 1. In the example shown, the liquid flows in the direction of the arrow in the conduit 1 and the differential producer takes the form of a Venturi tube portion 1' in said conduit. The high pressure tap 11 is connected to leg 12 of a conventional U-tube containing a manometric liquid such as mercury, while the low pressure tap 10 is connected to leg 13 of said U-tube. Float 9 rests upon the surface of a manometric liquid and is thus positioned in accordance with the differential pressure between points 10 and 11, or, in other words, in correspondence with the square of the rate of flow of the liquid in the conduit 1. Cam 7 is continuously rotated at the same constant speed rate as cam 4, for which purpose both of said cams may conveniently be mounted on the shaft of motor 5, as shown. Due to the shape of cam 7, the period of engagement between said cam and the contactor 8 in each cycle of rotation of said cam is proportional to the square root of the differential pressure between points 10 and 11, and is thus proportional to the rate of flow of the liquid in the conduit 1. The period of engagement between cam 4 and contactor 3, on the other hand, is proportional in each cycle to the displacement of contactor 3 from its zero position, and hence is proportional to the manually predetermined flow rate.

Positioned in conduit 1 downstream with respect to tap 10 is a valve 14 for regulating the rate of flow of the liquid in said conduit. This valve is operable in either direction by a reversible motor 15 of any suitable type, comprising field windings 16, 17 for causing rotation of its armature in opposite directions respectively. Crank 18 connected to segment 19 of said reversible motor 15 is in turn connected by link 20 and crank 21 to valve 14, here illustrated as of the butterfly type. Field winding 16 is connected to wire 22 from one pole of a suitable source of electrical energy, and is also connected through wire 23 to a stationary contact 24. Field winding 17 is also connected to said wire 22, and, through wire 25 to a stationary contact 26. A contact 27, carried by a movable arm 29 in which is a flexible section 29" is adapted to engage the contact 24 when said arm is moved in one direction from its normal position intermediate the contacts 24, 26; while a contact 28 carried by arm 29 is adapted to engage contact 26 when said arm is moved in the opposite direction from said normal position. Contacts 27, 28 are connected by a wire 22' with the other pole of the aforesaid source of electrical energy. Thus, whenever contacts 27 and 24 are in engagement a circuit is closed through winding 16 of reversible motor 15, causing the latter to rock the valve 14 in one direction; while when contacts 26 and 28 are in engagement the winding 17 of said motor is energized, and valve 14 is rocked in the opposite direction.

The arm 29 is operated to close the circuit through winding 16 or 17 by a pacer motor 30 under the control of the transmitters 2 and 6. The pacer motor is also reversible and is shown as of the well-known shading coil type. Field coil 31 of said motor is continuously connected to alternating current supply lines, which may, if desired, be connected to the same source as that to which motor 5 is connected. Shading coils 32, 33 of motor 30 are connected respectively to contactors 3 and 8. Said shading coils, as is well-known, act as secondary windings of a transformer of which the field coil 31 is the primary. When both coils 32 and 33 are open or shorted, motor 30 is locked in position, but when either coil 32 or 33 alone is shorted motor 30 will operate. Wire 36 common to both shading coils may be connected to a wire 37 which, through brushes 38, 39 is connected to cams 4 and 7 respectively. Thus, as long as contactors 3 and 8 are concurrently in engagement with the respective cams 4 and 7, the shading coils 32, 33 are concurrently energized, and motor 30 is stationary. When, however, either contactor 3 or 8 is engaged with its cam at the time when the other is not, the corresponding coil 32 or 33 will be energized while the other is open-circuited, and the motor 30 will operate in the corresponding direction. It may be observed in this connection that contactors 3 and 8 engage their respective cams at the same point in each cycle so that the signals from the transmitters 2 and 6 commence at the same point, the termination of said signals in each cycle depending upon the settings of said contactors with respect to said cams.

The pacer motor 30 is shown connected through gear 40, shaft 41, friction drive 42, and shaft 43, to gear 44 which forms an element of a differential gear unit. Gear 45 forms another element of said unit and is driven by motor 15 through gears 46, 47, and shaft 48. The arm 29 which carries contacts 27, 28, has journaled thereon a pinion 49 meshing with both gears 44 and 45, and acts as the conventional spider element of the differential gear system, turning about the axis of the gears 44 and 45 whenever said gears move unequally.

The operation of the apparatus illustrated in Fig. 1 is as follows:

The operator sets the desired rate at the master transmitter 2 by appropriately adjusting contactor 3 with respect to cam 4 so that said cam and contactor are in engagement for a time duration in each cycle corresponding to the desired rate as shown by the position of contactor 3 on scale 3'. Contactor 8 and cam 7 of dependent transmitter 6 are in engagement for a time duration in each cycle proportional to the actual flow rate in conduit 1. In each cycle the master and dependent transmitters operate to produce signals starting simultaneously and ending as the trailing edges of the cams 4 and 7 leave the respective contactors 3 and 8. Assuming that the desired control rate has been raised by the operator to a higher value than the actual rate, it is apparent that contactor 3 is in engagement with cam 4 for a longer period than is contactor 8 with cam 7, wherefore coil 32 of pacer motor 30 is energized for a longer period than is coil 33. If, on the other hand, the desired control rate has been lowered below that of the actual rate, the coil 33 is energized for a longer time than is coil 32. Thus, in each cycle in which coils 32 and 33 are energized for unequal periods the pacer motor 30 operates in the direction determined by the coil which is energized for the longer period, and through an extent corresponding to the difference in the durations of energization of said coils. This rotation of motor 30 is transmitted to differential gear 44 and spider pinion 49.

Valve 14, motor 15, and differential gear 45 remain stationary, until arm 29 is carried by rotation of gear 49 along stationary gear 45, into such position that contact 27 or 28 on said arm engages the corresponding contact 24 or 26. A circuit is thereby closed through the corresponding coil 16 or 17 of motor 15.

If, for example, the operator sets the contactor 3 of the master transmitter to a higher rate than that actually present in conduit 1, the resultant energization of pacer motor coil 32 while coil 33 is de-energized causes arm 29 to move toward that one of contacts 24, 26 which, when energized by the corresponding contact on arm 29, will cause motor 15 to operate valve 14 in the direction for increasing the flow rate in the conduit. Upon engagement of said contacts the motor 15 operates in the direction for increasing said flow rate. As soon as motor 15 commences operating, gear 45 turns in such direction as to move arm 29 to disengage said contacts, and upon disengagement of said contacts the motor 15 is de-energized. Said contacts are disengaged by rotation of gear 45 when motor 30 ceases rotating gear 44. This action may be sufficient to bring valve 14 into the proper position for obtaining the desired new rate of flow as determined by the setting of contactor 3, but, if it is not, said action is repeated in one or more successive cycles, the pacer motor engaging the contacts aforesaid in each cycle and the valve operating motor disengaging said contacts, until valve 14 assumes the proper position in which the desired new flow rate is obtained. Similarly, if the operator sets contactor 3 to a lower rate, pacer motor 30 turns in the reverse direction, to cause arm 29 to bring the proper contacts into engagement, and motor 15 operates valve 14 in the closing direction, until said contacts are disengaged, this action being repeated in each cycle, if necessary, until valve 14 is positioned to produce the desired lowered rate.

With valve 14 set in the position corresponding to the desired rate, any variation from said rate in the conduit 1 will result in operation of pacer motor 30 to shift arm 29 toward the appropriate contact for causing motor 15 to turn valve 14 in the proper direction to restore the set rate. By suitably spacing the contacts 24, 26 from the corresponding contacts 27, 28 on arm 29, the latter is permitted to simply oscillate between contacts 24, 26 without causing operation of the valve motor 15, but upon the accumulation of sufficient variations in one direction or the other said motor 15 operates to shift valve 14 in the direction for restoring the set rate. The pacer-motor contact apparatus thus functions as a form of integrator.

It may also be noted that the shading-coil type of motor illustrated is capable of instant response to even extremely small differences between the periods of contact at the respective transmitters. It may be of very low inertia, and is adapted to start instantly in response to the difference in contact periods aforesaid and to stop immediately upon the termination of said difference. It may be observed in this connection that the shading-coil type of motor, with field coil 31 continuously alive, has the further advantage of retaining its armature in its then position between operations, due to inherent braking action. Also the shading coils 32, 33 operate at an induced voltage only, so that the signaling circuits to the transmitters carry minimum operating hazards, and the motor is responsive to small currents in said circuits.

While the shading-coil type of pacer motor possesses the advantages above set forth, it will be understood that any other type of reversible motor capable of prompt response may be employed. For example small synchronous reversible motors of low inertia are known in the art and may be employed as pacer motors. It will also be evident that any suitable conventional type of reversible motor may be employed for the valve motor 15. Magnetic brakes well-known in the art for preventing over-travel of motors may also be employed.

The speed of the pacer motor 30, and/or of the valve motor 15, may be varied in any well known manner, so as to give maximum speed of valve 14 without hunting under a variety of conditions. A conventional speed adjusting element is illustrated for this purpose at 30' in conjunction with motor 30.

It will be further observed that, while the pacer motor may be of low inertia, instantly and precisely responsive even to minute variations in the dependent quantity, the valve motor 15 may be considerably more powerful, to insure effective operation of the valve. The valve motor at the same time is under the precise control of the pacer motor and moves only when necessary to effect the desired regulation. It will be seen that as soon as contacts 24, 27, or 26, 28 engage, the valve motor turns through the same angular extent as the pacer motor until said contacts are disengaged. Hunting is thus eliminated, while a particularly precise and sensitive control is obtained.

With a negligible gap between contacts 24 and 26, the apparatus described above controls the average flow rate exactly to that set over a period of time. With a finite gap, the maximum possible departure of total quantity is the same regardless of length of operation. It will be apparent that the portion of the period of energization of motor 30 during which motor 15 operates may be varied as desired by providing appropriate gearing between motor 15 and the differential gear, and/or between motor 30 and the differential gear. The friction drive coupling 42 enables slippage to occur whenever the pacer motor 30 is rotating and arm 29 is in either extreme position of its movement. The upper part of arm 29 which carries the contacts 27, 28, may be resilient as shown at 29" to permit a slight operation of the pacer motor after engagement of either pair of contacts, without slipping the coupling 42.

The resilience of the blade 29" should furthermore preferably be sufficient to enable motor 15 to build up to a desirable speed without danger of slipping the clutch 42. The gap between contacts 27, 28 and contacts 24, 26 also should be preferably sufficient to permit motor 15 to come to a stop without overrunning to such extent as to engage the opposite pair of contacts.

It may further be observed, that, with the gearing illustrated between valve 14 and differential gear 45, the latter, and hence the contact arm 29, will be driven at a higher rate of speed from motor 15 than is valve 14, and also at a higher speed than gear 44 is driven by pacer motor 30. This permits minute adjustments of the valve 14. Said gearing may, of course, be varied as desired.

The proportions and arrangements of cranks 18 and 21 and link 20 are such that motor 15 moves a relatively great distance for a slight movement of valve 14 when this valve is in its nearly closed position.

Figure 2:
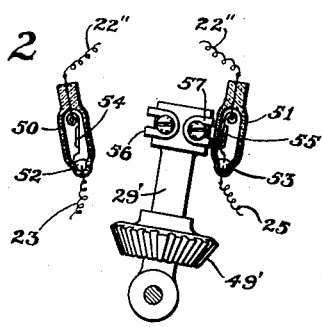
Fig. 2 is a view in side elevation, partly in section, of an alternative form of a contact mechanism for controlling a motor for governing the dependent quantity.

In Fig. 2 I have illustrated a pair of magnetically operated enclosed mercury switches 50, 51 of known type, for energizing the respective field coils of the valve motor under control of arm 29' of the differential gearing. Each switch 50, 51 has a globule 52, 53, respectively, of mercury or other suitable conducting liquid, connected to wires 23 and 25, respectively, of the valve motor field coils. The common return wire 22' is connected through branches 22", 22" to movable magnetic elements 54, 55, in the respective switches. Differential gear arm 29', on which is journaled pinion 49' for meshing with gears 44, 45 is the same as arm 29 of Fig. 1, except that said arm 29' is shown rigid throughout its length and has fixed thereto a pair of permanent magnets 56, 57. Approach of either magnet to within a predetermined distance of the corresponding switch 50 or 51 draws the magnetic element 54 or 55 of said switch into contact with the mercury globule 52 or 53, thereby energizing the corresponding field coil of the valve motor 15. In Fig. 2, the element 55 of switch 51 has been drawn into contact with globule 53 by magnet 57. While the magnet-carrying portion of arm 29' might be made resilient, the magnetic field of said magnets enables said arm to move slightly beyond the position in which it causes operation of either of the enclosed mercury switches.

Figure 3:
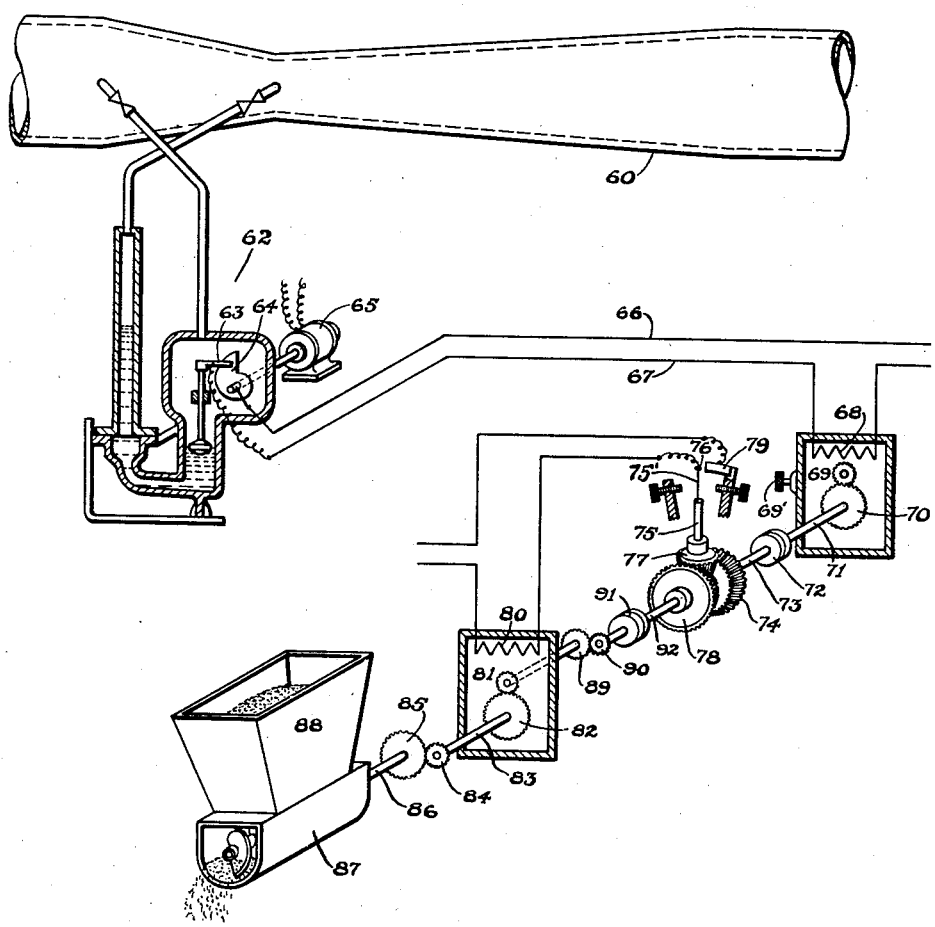
Fig. 3 is a diagrammatic view, partly in side elevation and partly in vertical section, of another embodiment.

In Fig. 3, means are shown for controlling the feeding of a substance in proportion to the rate of flow of a liquid in conduit 60. The transmitter 62, comprising float-positioned contactor 63 and square root cam 64 continuously driven at constant speed by motor 65, transmits cyclical signals over wires 66, 67, the signal in each cycle being of a time duration proportional to the rate of flow in conduit 60. Winding 68 of pacer motor 69, of any suitable type is energized by said signals, so that said motor operates in each cycle an extent corresponding to said flow rate.

Motor 69, through gear 70, shaft 71, friction drive 72, and shaft 73, drives gear 74 of a differential gear unit. An arm 75 carries a contact 76 and has journaled thereon a pinion 77 meshing with gear 74, said arm being journaled for rotation about the axes of the gears 74, 78 and in the manner of the usual differential gear spider member. Rotation of gear 74 by motor 69 with gear 78 stationary drives arm 75 in such direction as to engage contact 76 with a contact 79, and upon engagement of said contacts a circuit is closed through winding 80 of motor 81, setting said motor in operation. Motor 81, through gear 82, shaft 83, gears 84, 85, and shaft 86 drives a worm or other conventional feeder mechanism 87 for feeding material from hopper 88. At the same time, said motor 81 acts through gears 89, 90, friction drive 91, and shaft 92, to drive gear 78 in such direction as to retract arm 75 and to remove contact 76 from engagement with contact 79.

The speed of either motor 69 or 81 may be adjusted in any well-known manner. A conventional speed adjusting device 69' is shown in connection with motor 69.

It will be seen from the foregoing description that the pacer motor is energized in each cycle of rotation of cam 64 for the period during which said cam is engaged by contactor 63. Contact arm 75 is thereby rotated, and upon engagement of contact 76 with contact 79 the feed motor 81 is energized, and feeder 87 is operated. The operation of motor 81 drives gear 78 in the direction for rotating arm 75 away from contact 79, and this is done by operation of said motor 81 upon the de-energization of the pacer motor 69. The feeding of material from hopper 88 thus is maintained proportional to the rate of flow of liquid in the conduit 60. If the flow rate in said conduit decreases, the duration of operation of motor 81 is correspondingly shortened in each cycle. If said flow rate increases, the duration of operation of said motor 81 in each cycle is correspondingly lengthened. The material from hopper 88 may be fed either into conduit 60 or into any other desired receptacle.

In Fig. 3, as in Fig. 1, pacer motor 69 may be of low inertia capable of instant response to flow variations in the conduit, while motor 81 may be of adequate power to insure effective operation of the feed means. In the Fig. 3 embodiment, neither motor 69 nor motor 81 need be reversible. Motor 69 may be any convenient small, low inertia type, and motor 81 may be any type providing sufficient power to operate the feeder 87 promptly and efficiently. Magnetic or other well-known braking means may be provided for each motor to effect prompt stopping.

The gap between contacts 76, 79 may be such that minute flows in conduit 60 will not bring motor 81 into action until the accumulation of a sufficient quantity of flow to warrant operation of the feeder. Contact 76, like contacts 24, 26 in Fig. 1, may be adjusted in any suitable way as by screw or other convenient means, as will be obvious.

The portion of arm 75 which carries the contact 76 may be resilient as indicated at 75', for the same purposes as described in connection with arm 29 of Fig. 1.

While the invention has been described herein in connection with the control of the rate of flow or delivery of substances, it will be understood that such is merely illustrative and that the use of the invention is not restricted to the control of any particular variable quantity. Numerous modifications of the illustrative embodiments disclosed will furthermore be apparent to those skilled in the art. For example, in lieu of a single motor in Fig. 1 for driving the cams of the master and dependent transmitters, said cams may be driven by separate synchronous motors. Any suitable means well-known in the art may be employed for automatically maintaining the cams in exact synchronism when separate motors are utilized, though it may be noted that even if the cams are not in exact synchronism, with resultant slight operation of the pacer motor forward and backward in each cycle, such operation will not be objectionable so long as it is within the limits of the gap between blade 29'' and contacts 24, 26.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. In a telemetric controller, means for cyclically transmitting signals of a function of time corresponding with a variable master quantity, means for controlling a dependent quantity, contact means controlled by said transmitting means for energizing said controlling means, and means operated by said controlling means for shifting said contact means to a position wherein said controlling means is de-energized.

2. In a telemetric controller, means for cyclically transmitting signals of a function of time corresponding with a master quantity, means for controlling a variable quantity, contact controlling means operable in each cycle through an extent determined by the transmitting means, contact means controlled by said contact controlling means for energizing said variable quantity controlling means, and means connected to said variable quantity controlling means for shifting said contact means in a direction the reverse of that in which it is operated by said contact controlling means.

3. In a telemetric controller, means for cyclically transmitting signals of a function of time corresponding with a master quantity, motor means for controlling a variable quantity, motor means energized by said signals, differential gearing having an element operated by the first mentioned motor means and an element operated by the second mentioned motor means, and means operated by said differential gearing for energizing said first mentioned motor means.

4. In a telemetric controller, means for cyclically transmitting signals of a function of time corresponding with a master quantity, motor means for controlling a variable quantity, other motor means energized by said signals, a contact operated by the second mentioned motor means, a contact engaged by the first mentioned contact upon movement thereof through a predetermined extent for energizing the first mentioned motor means, and means operated by the first mentioned motor means for separating said contacts upon operation of said first mentioned motor means.

5. In a telemetric controller, means for cyclically transmitting signals of a time duration corresponding with a master quantity, means for cyclically transmitting signals of a time duration corresponding with a variable quantity, means jointly controlled by said signals for movement through an extent and in a direction corresponding to the difference in duration of said signals, motor means movable in either of opposite directions for controlling the variable quantity, contact means actuated by said jointly controlled means for energizing said motor means for movement in a direction determined by the direction of movement of said jointly controlled means, and means operated by said motor means for actuating said contact means to de-energize said motor means.

6. In a telemetric controller, means for cyclically transmitting signals of a function of time corresponding with a master quantity, pacer means controlled by said signals, motor means for regulating a dependent quantity, and contact means controlled by said pacer means and said motor means for energizing said motor means.

7. In a telemetric controller having an element positionable to regulate the value of a variable quantity, cyclical transmitter means responsive to a master quantity, cyclical transmitter means responsive to said variable quantity, pacer means controlled jointly by said transmitter means in response to variations from a given relation between the master and variable quantities, power means controlled by said pacer means for operating said element, governing means controlled by said pacer means for bringing said power means into action, and follow-up means operatively connected to said element for operating said governing means at a higher rate than said pacer means.

8. In a telemetric controller, transmitter means responsive to a master quantity for cyclically transmitting signal impulses corresponding to said master quantity, transmitter means responsive to a variable quantity for cyclically transmitting signal impulses corresponding to said variable quantity, pacer means controlled jointly by said transmitter means for movement in each of a series of successive transmitting cycles through an extent and in a direction corresponding to variations from a given relation between the master and dependent quantities, means for algebraically integrating motion of said pacer means, and power means controlled by said integrating means upon the accumulation of a predetermined amount of algebraically integrated motion of said pacer means for regulating said dependent quantity to maintain said relation.

9. The method of controlling the relation between a dependent quantity and a master quantity, comprising cyclically transmitting signals of a function of time corresponding to the respective quantities, translating minute variations from said relation under control of said signals into motion of a low-inertia element in each of a series of successive transmitting cycles through an extent and in a direction corresponding to said variations, accumulating said variations algebraically, and energizing a power means of substantially higher inertia for restoring said relation by the accumulation of a predetermined extent of motion of said low-inertia element.

10. In a telemetric controller, pacer means responsive to variations from a given relation between cyclical signals of a function of time corresponding to a master and a dependent quantity, means controlled by said pacer means for cyclically integrating departures from said relation and power means controlled by said integrating means for regulating said dependent quantity to maintain substantially said relation and operable only upon a predetermined extent of integration of said departures.

11. In a telemetric controller, transmitter means responsive to a master quantity for cyclically transmitting signal impulses corresponding to said master quantity, transmitter means responsive to a dependent quantity for cyclically transmitting signal impulses corresponding to said dependent quantity, means jointly controlled by said transmitter means in response to variations from a given relation between said master and dependent quantities for integrating departures from said relation in successive transmitting cycles, and motor means energized under control of said jointly controlled means in response to a predetermined integration of said departures for regulating said dependent quantity to restore said relation.

12. In a telemetric controller, transmitter means responsive to a master quantity for cyclically transmitting signal impulses corresponding to said master quantity, transmitter means responsive to a variable quantity for cyclically transmitting signal impulses corresponding to said variable quantity, power means for regulating said dependent quantity, and means controlled jointly by said transmitter means for accumulating slight variations from a given relation between the master and dependent quantities in successive transmitting cycles and for energizing said regulating means upon a given accumulation of said variations to cause operation of said regulating means in a direction for restoring said relation.

13. In a telemetric controller, transmitter means responsive to a master quantity for cyclically transmitting signal impulses corresponding to said master quantity, transmitter means responsive to a dependent quantity for cyclically transmitting signal impulses corresponding to said dependent quantity, a pacer motor controlled jointly by said transmitter means for movement in each of a series of successive transmitting cycles through an extent and in a direction corresponding to variations from a given relation between said master and dependent quantities, means for regulating said dependent quantity, and means controlled by said pacer motor for accumulating slight variations from said relation in successive transmitting cycles and for energizing said regulating means upon a given accumulation of said variations to cause operation of said regulating means in a direction for restoring said relation.

ED S. SMITH, Jr.